3,332,940
PROCESS FOR THE PREPARATION OF 17α-
ACYLOXY - 6 - METHYL - 16 - METHYLENE-
4,6 - PREGNADIENE - 3,20 - DIONES AND IN-
TERMEDIATES OBTAINED THEREFROM
David Neville Kirk, Christchurch, South Island, New
Zealand, and Vladimir Petrow and David Morton Williamson, London, England, assignors to The British
Drug Houses Limited
No Drawing. Original application July 7, 1960, Ser.
No. 41,256. Divided and this application Jan. 5,
1965, Ser. No. 423,579
Claims priority, application Great Britain, Aug. 28, 1959,
29,508/59
13 Claims. (Cl. 260—239.55)

This application is a division of our copending application Ser. No. 41,256, filed July 7, 1960.

This invention is for improvements in or relating to organic compounds and has particular reference to new steroidal acyloxydiene diones having the general Formula I below and a method for their preparation.

It is an object of the invention to provide new acyloxydienediones having the general Formula I below which compounds are of value on account of their biological properties and in particular on account of their progestational properties. Thus it is an object of the present invention to provide the acetoxy derivative (I; R=Ac) which is an exceptionally active progestational agent. For example, in the Clauberg assay it has a progestational activity when administered orally of 100 times that of dimethisterone (6α:21-dimethylethisterone, which has a progestational activity of 10 times that of pregnenolone-17α-ethinyl-Δ⁴-androstan-17β-ol-3-one. The acetoxy derivative (I; R=Ac) is also an exceptionally active ovulation inhibitor. Additionally, it is inactive as an oestrogen and has no anabolic or androgenic activity. Its potential progestational activity renders the material of great value in medical and veterinary practice whether as tablets, elixirs, suppositories or injections.

The invention also provides the new intermediates

3β-acetoxy-6,16-dimethyl-16α,17α-epoxypregn-5-en-20-one (III; R'=Ac)
3β-acetoxy-17α-hydroxy-6-methyl-16-methylenepregn-5-en-20-one (IV; R'=Ac)
3β,17α-diacetoxy-6-methyl-16-methylenepregn-5-en-20-one (V; R=R'=Ac)
17α-acetoxy-3β-hydroxy-6-methyl-16-methylenepregn-5-en-20-one (V; R=Ac, R'=H)

According to the present invention there is provided a process for the preparation of 17α-acyloxy-6-methyl-16-methylenepregna-4,6-diene-3,20-diones having the general formula

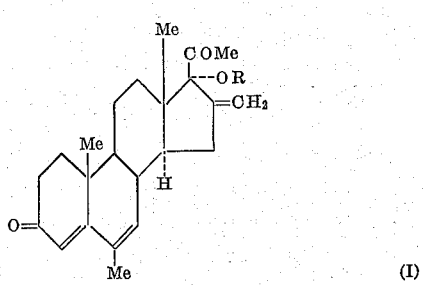

(I)

(where R is an acyl group containing up to 6 carbon atoms) which process comprises oxidising a 3β-hydroxy or 3β-acyloxy-6,16-dimethylpregna-5,16-dien-20-one having the general formula

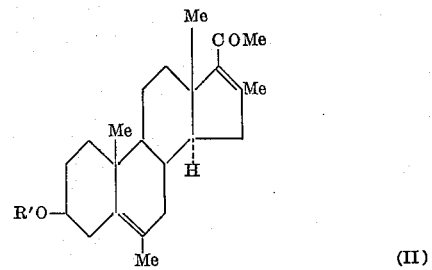

(II)

(where R' is hydrogen or an acyl group containing up to 6 carbon atoms) to the corresponding 16α,17α-epoxide having the general formula

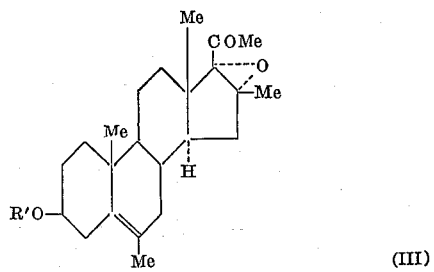

(III)

(where R' is hydrogen or an acyl group containing up to 6 carbon atoms), acylating the 16α,17α-epoxide in cases where R'=H, converting the 16α,17α-epoxide into a 17α-hydroxy-16-methylene derivative having the general formula

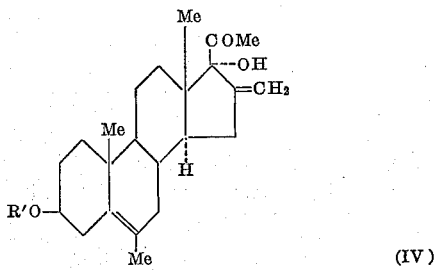

(IV)

(where R' is an acyl group containing up to 6 carbon atoms) by treatment with a source of hydrogen ions, subjecting the 17α-hydroxy-16-methylene derivative to enforced acylation to give a diacyl derivative having the formula

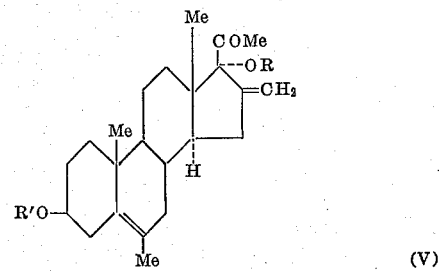

(V)

(where R and R' are both acyl groups containing up to 6 carbon atoms), preferentially hydrolysing the diacyl derivative to give the corresponding 3β-hydroxy-17α-acyloxy derivative having the general formula V (where R' is hydrogen and R is an acyl group containing up to 10 carbon atoms) and subjecting the 3β-hydroxy-17α-acyloxy derivative to an Oppenauer oxidation.

The preparation of the 3β-hydroxy or 3β-acyloxy-6,16-dimethylpregna-5,16-dien-20-one (II) employed as starting material in the present invention is described in our copending application No. 824,961, now Pat. No. 3,028,-381.

It is unequivocally established by prior art that 16α,17α-epoxypregnan-20-ones on treatment with hydrogen halides, followed by catalytic reduction of the halohydrin thus produced, yield the corresponding 17α-hydroxypregnan-20-ones but we have found that reaction of the 16-methyl-16α,17α-epoxypregnan-20-one with a source of hydrogen ions, such as a hydrogen halide, gives a product which we formulate as the corresponding 16-methylene-17α-hydroxypregnan-20-one because its infra-red spectrum is compatible with this structure and because reduction to the corresponding 17α-20-diol followed by oxidation of the glycol with periodic acid yields an α,β-unsaturated ketone which is believed to be a 16-methylene 17-ketone.

Enforced acylation of the 3β-acyloxy-17α-hydroxy-6-methyl-16-methylenepregn-5-en-20-one proceeds to give 3β,17α - diacyloxy-6-methyl-16-methylenepregn-5-en-20-one (V; where R and R′ are acyl groups containing up to 6 carbon atoms)

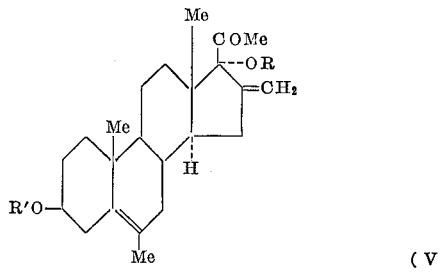

(V)

Preferential hydrolysis of the 3β-acyloxy group gives the corresponding 3β-hydroxy acyloxy derivative having the general Formula V where R′ is hydrogen and R is as hereinabove defined. Oxidation of the latter compound to the required 3-oxo-4,6-diene (I) is performed with a benzoquinone in the presence of an Oppenauer oxidant.

Conversion of the 3β-hydroxy or 3β-acyloxy-6,16-dimethylpregna-5,16-dien-20-one (II) into the 16α,17α-epoxide (III; R=H) may be effected by means of tert.-butyl hydroperoxide in alkaline solution or preferably with hydrogen peroxide in an alcoholic solution made alkaline with a hydroxide such as sodium or potassium hydroxide. The reaction proceeds readily at 0° C. but may be accelerated by using temperatures up to the boiling-point of the alcohol used as solvent. Complete saponification of the 3β-acyloxy group (if present) occurs during this reaction and the product is acylated to give 3β-acyloxy-16α,17α-epoxy-6-methyl-16-methylpregn-5-en-20-one (III; R′=acyl). The 3-acyl derivative of the 16α,17α-epoxide (III; R′=acyl) is then treated with a source of hydrogen ions such as H₂SO₄ or HBr in a non-polar solvent such as for example, dioxan, benzene or ether at temperatures below 20° C. and preferably in the range from 0° C. to 10° C. when fission of the epoxide ring occurs with concomitant dehydration to yield the 3β-acyloxy-17α-hydroxy-6-methyl-16-methylenepregn-5-en - 20 - one (IV; R′=acyl). Acylation of the last compound is effected by employing enforced conditions of acylation such as, for example, reaction with acetic anhydride in the presence of an acid catalyst such as toluene-p-sulphonic acid monohydrate at room temperature for 24 hours, giving 3β,17α-diacyloxy-6-methyl-16-methylenepregn-5-en-20 - one (V; R=R′=acyl).

Partial hydrolysis of the diacyl derivative (V; R=R′=acyl)

is performed by employing hot ethanolic or methanolic hydrochloric acid, when the corresponding 17α-acyloxy-3β-hydroxy-compound (V; R=acyl, R′=H) is obtained.

In converting the 3β-hydroxy - Δ⁵ - intermediate (V; R=acyl, R′=H) into the required 3-oxo-4,6-diene (I) which is the subject of the present invention, (I; R=acyl) a quinone is employed, preferably p-benzoquinone or chloranil (tetrachloro-p-benzoquinone); 2,3 - dicyano-p-benzoquinone or 2,3-dichloro-5,6-dicyano-p-benzoquinone may also be employed. The Oppenauer oxidant is an aluminum alkoxide, preferably aluminum tert.-butoxide, aluminum iso-propoxide or an aluminum chloro-alkoxide such as aluminum chloro-iso-propoxide in a solvent which is preferably benzene or toluene.

The solvent may be any convenient solvent or mixture of solvents in which the reactants are soluble and stable, such as benzene, toluene, or xylene, or mixtures of these with each other or with diluents such as dioxan, diethyl ether or tetrahydrofuran. The reaction is most conveniently carried out by mixing the steroid and the quinone in one of the above mentioned solvents with a solution of the aluminum alkoxide in benzene, toluene or xylene, but possible variations of this procedure will be apparent to those skilled in the art. The reaction may be carried out at temperatures between 0° C. and the boiling point of the reaction mixture, the time required being reduced by employing higher temperatures. The preferred temperature for optimum yield, is room temperature, when the reaction takes up to 72 hours. At the reflux temperature of the mixture, the reaction is complete within ½ to 2 hours.

The product may be isolated by pouring the reaction mixture into an aqueous solution of sodium or potassium hydroxide, extracting the steroidal material with a solvent such as ether, benzene or chloroform, and washing and evaporating the organic solution.

Following is a description by way of example of a method for carrying the invention into effect.

EXAMPLE 1

*3β-acetoxy-6,16-dimethyl-16α,17α-epoxypregn-5-en-20-one (III; R′=Ac)*

3β-acetoxy-6,16-dimethylpregna-5,16-dien-20-one (6.3 g.) dissolved in boiling ethanol (50 ml.) under reflux, was treated with 40% aqueous sodium hydroxide solution (3 ml.) followed by 30% hydrogen peroxide (8.5 ml.) and the mixture boiled for a further 30 minutes. The reaction mixture was cooled and the crystalline product collected, dried and acetylated with acetic anhydride/pyridine at 100° C. for 1 hour and purified from methanol to give 3β - acetoxy-6,16-dimethyl-16α,17α-epoxypregn - 5 - ene - 20 - one, needles, M.P. 118 to 120° C. $[\alpha]_D^{23}$—49° (c., 0.654 in chloroform).

*3β-acetoxy-17α-hydroxy-6-methyl-16-methylenepregn-5-en-20-one (IV; R′=Ac)*

3β - acetoxy - 6,16 - dimethyl - 16α,17α - epoxypregn-5-en-20-one (8 g.) dissolved in dioxan (200 ml.) cooled in an ice/water bath was treated with a 50% solution of hydrogen bromide in acetic acid (4 ml.) for 15 minutes. The dioxan was diluted with water and the product isolated with ether. The residue, after evaporation of the ether, was crystallised from hexene to give 3β-acetoxy-17α - hydroxy - 6 - methyl - 16 - methylenepregn - 5 - en-20-one, needles, M.P. about 126 to 128° C. or 147 to 149° C., $[\alpha]_D^{24}$—161° (c., 0.306 in chloroform).

*3β,17α-diacetoxy-6-methyl-16-methylenepregn-5-en-20-one (V; R=R′=Ac)*

3β - acetoxy - 17α - hydroxy - 6 - methyl - 16 - methylenepregn-5-en-20-one (1 g.) and toluene-p-sulphonic acid monohydrate (150 mg.) were suspended in acetic anhydride (35 ml.) and left overnight at room temperature. The clear solution was poured into water, and the product isolated with ether. The residue from the ether extracts crystallised from hexane in plates to give the 3β,17α-diacetoxy - 6 - methyl - 16 - methylenepregn - 5 - en - 20- one about 166 to 168° C., $[\alpha]_D^{25}$ —178° (c., 0.882 in chloroform).

The latter compound (V; R=R'=Ac) (1 g.) was heated under reflux in methanol (100 ml.) containing concentrated hydrochloric acid (1 ml.) for 1 hour. The mixture was poured into water and the precipitate collected and crystallised from aqueous methanol to give 17α - acetoxy - 3β - hydroxy - 6 - methyl - 16 - methylene-pregn-5-en-20-one (V; R=Ac, R'=H), needles, M.P. about 163 to 164° C., $[\alpha]_D^{25}$—165° (c., 0.334 in chloroform).

*17α-acetoxy-6-methyl-16-methylenepregna-4,6-diene-3,20-dione (I; R=Ac)*

The above 3β-hydroxy-Δ⁵-6-methyl compound (V; R=Ac, R'=H) (2 g.) aluminium tert.-butoxide (2 g.) and p-benzoquinone (3.3 g.) were dissolved in dry benzene (200 ml.) and left at room temperature for 72 hours. The benzene was washed with 5% aqueous sodium hydroxide solution and with water, dried over sodium sulphate and evaporated under reduced pressure. The residue was crystallised from acetone/hexane to give the required 17α - acetoxy - 6 - methyl - 16 - methylenepregna-4,6-diene-3,20-dione (I; R=Ac), needles, M.P. about 224 to 226° C., $[\alpha]_D^{23}$—127° (c., 0.31 in chloroform)

$\lambda_{max.}^{EtOH}$ 287.5 mμ (log ε=4.35)

EXAMPLE 2

*3β-acetoxy-17α-caproyloxy-6-methyl-16-methylenepregn-5-en-20-one (V; R=CO.C₅H₁₁; R'=Ac-*

3β - acetoxy - 17α - hydroxy - 6 - methyl - 16 - methylenepregn-5-en-20-one (IV; R'=Ac) (1 g.) and toluene-p-sulphonic acid monohydrate (150 mg.) were suspended in caproic anhydride (30 ml.) and the mixture left at room temperature for 4 days. Pyridine (10 ml.) was then added and the mixture steam-distilled until no more organic matter was present in the distillate, when the product was extracted from the residual liquor with ether, and was obtained as a gum after removal of the ether.

*17α-caproyloxy-3β-hydroxy-6-methyl-16-methylenepregn-5-en-20-one (V; R=CO.C₅H₁₁; R'=H)*

The foregoing product was heated under reflux in methanol (100 ml.) containing concentrated hydrochloric acid (1 ml.) for 1 hour, poured into water, and the product isolated with ether.

*17α-caproyloxy-6-methyl-16-methylenepregna-4,6-diene-3,20-dione (I; R=CO.C₅H₁₁)*

The foregoing product with aluminum tert.-butoxide (1 g.) and p-benzoquinone (1.6 g.) was dissolved in dry benzene (100 ml.) and the mixture stirred at room temperature for 3 days. The benzene was washed with 5% aqueous sodium hydroxide solution. The residue, after removal of the benzene, was a gum, which after chromatography on an alumina column afforded 17α-caproyloxy-6-methyl-16-methylenepregna-4,6-diene-3,20-dione as a solid $\lambda_{max.}^{EtOH}$ 288 mμ

We claim:
1. A process for the preparation of 17α-acyloxy-6-methyl-16-methylenepregna-4,6-diene-3,20-diones having the general formula

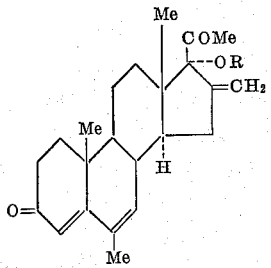

(I)

(where R is an acyl group of a hydrocarbon carboxylic acid containing up to 6 carbon atoms) which process comprises oxidising a 3β-hydroxy or 3β-acyloxy-6,16-dimethylpregna-5,16-dien-20-one having the general formula

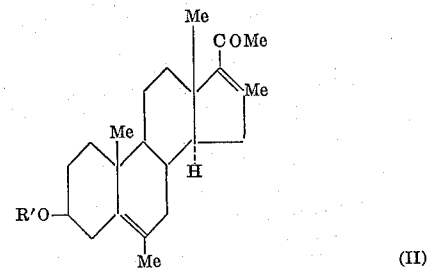

(II)

(where R' is hydrogen or an acyl group of a hydrocarbon carboxylic acid containing up to 6 carbon atoms) to the corresponding 16α,17α-epoxide having the general formula

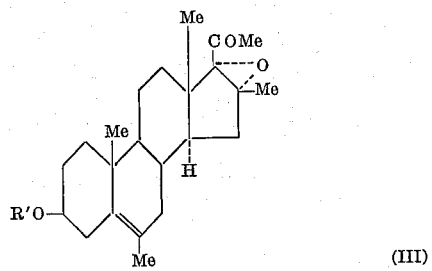

(III)

(where R' is hydrogen or an acyl group containing up to 6 carbon atoms), acylating the 16α,17α-epoxide in cases where R'=H, converting the 16α,17α-epoxide into a 17α-hydroxy-16-methylene derivative having the general formula

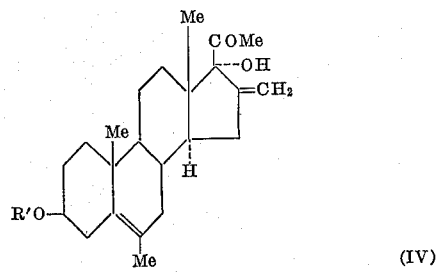

(IV)

(where R' is an acyl group of a hydrocarbon carboxylic acid containing up to 6 carbon atoms) by treatment with a source of hydrogen ions, subjecting the 17α-hydroxy-16-methylene derivative to enforced acylation to give a diacyl derivative having the formula

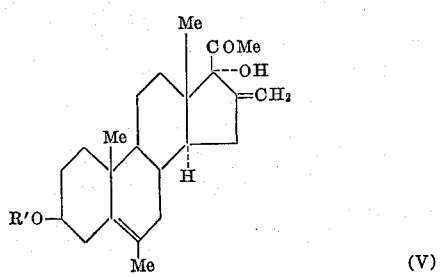

(V)

(where R and R' are both acyl groups of a hydrocarbon carboxylic acid containing up to 6 carbon atoms), preferentially hydrolysing the diacyl derivative to give the corresponding 3β-hydroxy-17α-acyloxy derivative having the general Formula V (where R' is hydrogen and R is an acyl group of a hydrocarbon carboxylic acid containing up to 6 carbon atoms) and subjecting the 3β-hydroxy-17α-acyloxy derivative to an Oppenauer oxidation in the presence of a quinone.

2. A process as claimed in claim 1 wherein the 3β-hydroxy or 3β-acyloxy-6,16-dimethylpregna-5,16-dien-20-one is oxidised with hydrogen peroxide in alkaline alcoholic solution.

3. A process as claimed in claim 1 wherein the source of hydrogen ions is sulphuric acid or hydrogen bromide in a non-polar solvent.

4. A process as claimed in claim 1 wherein the enforced acylation is effected by reaction with acetic anhydride in the presence of toluene-p-sulphonic acid monohydrate.

5. A process as claimed in claim 1 wherein the preferential hydrolysis is performed with hot ethanolic or methanolic hydrochloric acid.

6. A process as claimed in claim 1 wherein the 3β-hydroxy-17α-acyloxy derivative is mixed with a quinone and reacted with a solution of an aluminium alkoxide in a solvent.

7. A process as claimed in claim 6 wherein the quinone is p-benzoquinone or chloranil.

8. A process as claimed in claim 6 wherein the aluminium alkoxide is aluminium tert.-butoxide in benzene.

9. 3β - acetoxy - 6,16 - dimethyl - 16α,17α - epoxypregn-5-en-20-one.

10. 3β - acetoxy - 17α - hydroxy - 6 - methyl - 16 - methylenepregn-5-en-20-one.

11. 3β,17α - diacetoxy - 6 - methyl - 16 - methylenepregn-5-en-20-one.

12. 17α - acetoxy - 3β - hydroxy - 6 - methyl - 16 - methylenepregn-5-en-20-one.

13. Compounds having the formula

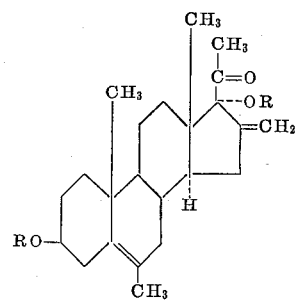

wherein R is selected from the class consisting of hydrogen and an acyl group of a hydrocarbon carboxylic acid having up to 6 carbon atoms.

References Cited
UNITED STATES PATENTS 3,074,977  1/1963  Mannhardt et al. ___ 260—397.4

OTHER REFERENCES

Kirk et al.: "J. Chem. Soc." (1961). Pages 2821–2824, copy in P.O.S.L.

Ellis et al.: "J. Chem. Soc." (1962). Pages 22–25 relied on, copy in P.O.S.L.

ELBERT L. ROBERTS, *Primary Examiner.*